United States Patent [19]

Saotome

[11] Patent Number: 4,816,923
[45] Date of Patent: Mar. 28, 1989

[54] TWO DIMENSIONAL LIGHT BEAM SCANNER USED IN RADIATION IMAGE INFORMATION READOUT

[75] Inventor: Shigeru Saotome, Kanagawa, Japan

[73] Assignee: Fuji Photo Film Co., Ltd., Japan

[21] Appl. No.: 917,059

[22] Filed: Oct. 9, 1986

[30] Foreign Application Priority Data

Oct. 17, 1985 [JP] Japan ................. 60-232024

[51] Int. Cl.⁴ ............... H04N 1/06; H04N 1/028; H04N 1/04
[52] U.S. Cl. .................. 358/292; 358/199; 358/208; 358/285; 358/293
[58] Field of Search .......... 358/285, 289, 290, 291, 358/292, 296, 293, 199, 206, 208

[56] References Cited

U.S. PATENT DOCUMENTS

| | | | |
|---|---|---|---|
| 4,206,482 | 6/1980 | Delavalette et al. ............. | 358/290 |
| 4,258,264 | 3/1981 | Kotera et al. ................ | 250/327.2 |
| 4,260,998 | 4/1981 | Fukui ..................... | 358/290 |
| 4,276,473 | 6/1981 | Kato et al. ................. | 250/327.2 |
| 4,468,707 | 8/1984 | Kuehnle et al. ............... | 358/290 |
| 4,525,749 | 6/1985 | Maeda et al. ................ | 358/290 |
| 4,595,957 | 6/1986 | Holthusen .................. | 358/290 |
| 4,750,045 | 6/1988 | Ohara et al. ................ | 358/293 |

FOREIGN PATENT DOCUMENTS

| | | |
|---|---|---|
| 116340 | 9/1980 | Japan . |
| 11395 | 2/1981 | Japan . |
| 44266 | 4/1981 | Japan ................. 358/292 |
| 18161 | 1/1982 | Japan ................. 358/292 |
| 111572 | 6/1985 | Japan ................. 358/292 |
| 29490 | 7/1986 | Japan . |

Primary Examiner—James J. Groody
Assistant Examiner—Randall S. Svihla
Attorney, Agent, or Firm—Gerald J. Ferguson, Jr.

[57] ABSTRACT

A radiation image information readout device has a sheet fixedly supported on the concave surface of a semicylindrical support is scanned in a main scanning direction by a light beam which is emitted from a light source and deflected by a main scanning light deflector, and is also scanned by the light beam in a sub-scanning direction normal to the main scanning direction by angularly moving the light source and the main scanning light deflector. The light source and the main scanning light deflector are angularly moved about an axis of curvature of the semicylindrical support. The light source and the main scanning light deflector are fixedly mounted in a cylindrical member which is angularly driven about its own axis by a motor coupled to one axial end thereof. A readout device is angularly movable with the light source and the main scanning light deflector for reading out the radiation image information from the recording sheet while the recording sheet is scanned by the light beam in the main and sub-scanning directions.

8 Claims, 1 Drawing Sheet

TWO DIMENSIONAL LIGHT BEAM SCANNER USED IN RADIATION IMAGE INFORMATION READOUT

BACKGROUND OF THE INVENTION

1. Field of the Invention

The present invention relates to a light beam scanner for deflecting a light beam with a light deflector, and more particularly to a light beam scanner for two-dimensionally scanning a fixed sheet with a light beam.

2. Description of the Prior Art

Light beam scanners including light deflectors such as galvanometer mirrors, rotating polygonal mirrors, and hologram scanners for deflecting a light beam to two-dimensionally scan a sheet have found wide use in various scanning recording apparatus, scanning readout apparatus, and the like. The two-dimensional scanning of the sheet has heretofore been effected by mechanically transferring the sheet in one direction for sub-scanning thereof while one-dimensionally deflecting the light beam in a direction substantially normal to the foregoing direction for main scanning of the sheet. For two-dimensionally scanning the sheet in this manner, it is important that the sheet being scanned be transferred at a stable speed in said one direction, i.e., the sub-scanning direction. If the sheet being scanned were not transferred highly accurately at a constant speed, it would be scanned irregularly by the light beam, and image information read out, for example, from the sheet during scanning thereof would be distorted. Therefore, the sheet has conventionally been transferred in the sub-scanning direction by a high-precision motor which can feed the sheet highly accurately at a low speed in one direction. However, since such a high-precision motor is expensive, the cost of the entire light beam scanner is substantially increased. Some sheets to be scanned by a light beam tend to flex out of complete flatness while they are being transferred. To allow such sheets to be transferred completely flatwise, it has been one practice to employ an attracting means such as a suction box within an endless belt which supports a sheet thereon and to activate the attracting means for holding the sheet in intimate contact with the endless belt to keep the sheet flatwise against accidental displacement while being transferred accurately at a constant speed. Use of such an attracting means in addition to the high-precision motor has resulted in a further increase in the cost of manufacture of the light beam scanner.

The space provided for the transfer of a sheet in the light beam scanner has to be of a size in the sub-scanning direction which is at least twice the length of the scanned area of the sheet in the sub-scanning direction. As a consequence, it has been difficult to reduce the size of the light beam scanner, and the relatively large light beam scanner is not suitable for use in a limited space.

SUMMARY OF THE INVENTION

In view of the aforesaid drawbacks of the conventional light beam scanner, it is an object of the present invention to provide a light beam scanner which is small in size and can be manufactured inexpensively.

According to the present invention, a sheet to be scanned is fixedly supported on a cylindrical surface and is two-dimensionally scanned by a light beam which is emitted from a light source and deflected by a main scanning light deflector while at the same time the light source and the main scanning light deflector are being angularly moved. More specifically, a light beam scanner of the invention comprises a support means for supporting a sheet to be scanned on a cylindrical surface, a light source for emitting a light beam, a main scanning light deflector disposed at the axis of curvature of the cylindrical surface for deflecting the light beam from the light source toward the cylindrical surface to scan the sheet on the cylindrical surface with the light beam in a main scanning direction substantially parallel to the axis, and a sub-scanning means for angularly moving the light source and the main scanning light deflector about the axis to scan the sheet on the cylindrical surface with the light beam in a sub-scanning direction normal to the main scanning direction.

Since the sheet is fixed and scanned in the sub-scanning direction by angularly moving the light source and the main scanning light deflector, no need arises for a high-precision motor such as has heretofore been employed to transfer the sheet in the sub-scanning direction, or for an attracting means such as has been used to hold the sheet on an endless belt. Therefore, the light beam scanner of the present invention is smaller in size and can be manufactured inexpensively.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
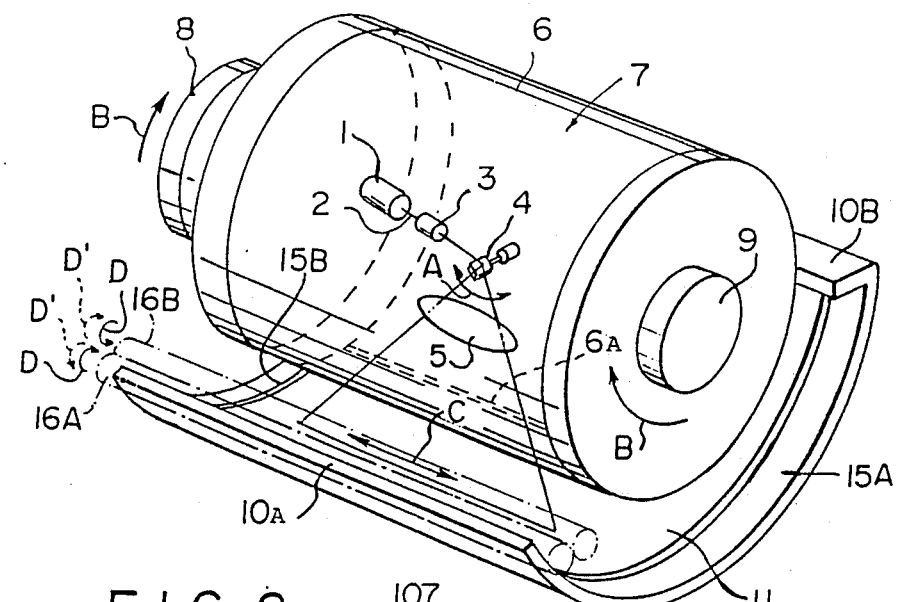
FIG. 1 is a perspective view of a light beam scanner according to the present invention.

FIG. 1 shows a light beam scanner according to the present invention. A light beam 2 emitted from a light beam source 1 such as a laser beam source is converted by a beam expander 3 into a light beam having a suitable beam diameter. The expanded light beam 2 is then applied to a main scanning light deflector 4 comprising a galvanometer mirror which reflects and deflects the light beam 2 in the direction of the arrow A. A scanning lens 5 in the form of a fθ lens is disposed in the optical path of the light beam 2 as it is reflected and deflected by the galvanometer mirror 4. The laser beam source 1, the beam expander 3, the galvanometer mirror 4, and the fθ lens 5 jointly constitute an optical system which is housed in a hollow cylindrical member 6, thus providing an angularly movable optical unit 7. A motor 8 is coupled to one axial end of the cylindrical member 6 while a bearing 9 is mounted on the other axial end of the cylindrical member 6. The cylindrical member 6 is angularly moved by the motor 8 in the direction of the arrow B, and so are the optical components as described above which are housed in the cylindrical member 6. The galvanometer mirror 4 is positioned on the optical axis of the optical unit 7 for deflecting the light beam 2 in a direction substantially parallel to the optical axis of the optical unit 7. The cylindrical member 6 has an axial slit 6A defined in a cylindrical wall thereof within the optical path of the light beam 2 as deflected by the galvanometer mirror 4. Therefore, the light beam 2 which is deflected by the galvanometer mirror 4 passes out of the optical unit 7 radially outwardly through the slit 6A.

A semicylindrical support 10 is disposed around part of the optical unit 7 and has its center of curvature aligned with the axis of angular movement of the optical unit 7. The semicylindrical support 10 supports a sheet 11 to be scanned on its concave surface confronting the optical unit 7. The light beam 2 which is reflected and deflected by the galvanometer mirror 4 scans the sheet 11 in the direction of the arrow C (main scanning). At the same time, since the optical unit 7 is angularly moved about its own axis in the direction of the arrow B (sub-scanning), substantially the entire surface of the sheet 11 is two-dimensionally scanned by the light beam 2. The light beam 2 is caused by the f$\theta$ lens 5 to scan the sheet 11 at a constant speed and with a uniform beam spot diameter.

A pair of feed rollers 16A, 16B is disposed on one end 10A of the support 10 for delivering the sheet 11 onto the semicylindrical support 10. The semicylindrical support 10 has a pair of spaced guide plates 15A, 15B extending in the sub-scanning direction and projecting inwardly from the surface of the semicylindrical support 10 for guiding the sheet 11 in the sub-scanning direction when the sheet 11 is delivered onto the semicylindrical support 10. Upon rotation of the feed rollers 16A, 16B about their own axes in the respective directions of the solid-line arrows D, the sheet 11 is delivered along the guide plates 15A, 15B onto the surface of the semicylindrical support 10 axially between the guide plates 15A, 15B. The sheet 11 is stopped in position when its leading end engages a stopper 10B on the end of the support 10 remote from the feed rollers 16A, 16B. With the sheet 11 thus stopped in position, the trailing end of the sheet 11 is gripped between the feed rollers 16A, 16B. When the scanning of the sheet 11 is finished, the feed rollers 16A, 16B are rotated in the opposite directions indicated by the dotted-line arrows D', respectively, to deliver the sheet 11 off the support 10. The sheet 11 may be delivered onto and off the support 10, and positioned in the support 10 by any of various known means. For example, means for moving the sheet, other than the illustrated feed rollers 16A, 16B, may be employed.

With the aforesaid arrangement of the light beam scanner, the sub-scanning of the sheet is carried out by angularly moving the light beam source, the light deflector, and other optical components, without moving the sheet in the sub-scanning direction. Therefore, the length of the light beam scanner in the sub-scanning direction may be half the length of the conventional light beam scanners, and the size of the light beam scanner is reduced. Since it is much easier to angularly move the optical system than to transfer the sheet in the sub-scanning direction, the motor 8 and its associated transmission mechanism (not shown) for angularly moving the optical system in the sub-scanning direction can be less complex than the conventional high-precision motor and its associated transmission mechanism used to transfer the sheet in the sub-scanning direction. The sheet is immovably and stably supported on the semicylindrical support, and no attracting means such as a suction box is required for holding the sheet in position. For the reasons described above, the light beam scanner is simple in structure and inexpensive to manufacture.

A radiation image information readout device incorporating the principles of the present invention will be described with reference to FIG. 2.

It is known that when a certain phosphor is exposed to a radiation such as X-rays, $\alpha$-rays, $\beta$-rays, $\gamma$-rays, cathode rays, or ultraviolet rays, the phosphor stores a part of the energy of the radiation, and that when the phosphor exposed to the radiation is exposed to stimulating rays such as visible light, the phosphor emits light in proportion to the stored energy of the radiation. The phosphor exhibiting such a property is referred to as a "stimulable phosphor".

There has been proposed a radiation image recording and readout system employing such a stimulable phosphor. More specifically, the radiation image of an object such as a human body is stored in a sheet of stimulable phosphor (hereinafter referred to as a "stimulable phosphor sheet" or a "phosphor sheet"), and then the stimulable phosphor sheet is scanned with stimulating rays to cause the stimulable phosphor sheet to emit light representative of the radiation image. The emitted light is then photoelectrically detected to produce an image information signal that is electrically processed for generating a radiation image of the human body, which is recorded on a recording medium such as a photosensitive material or displayed as a visible image on a CRT. The aforesaid radiation image recording and readout system is disclosed in Japanese Kokais Nos. 55-12429 and 56-11395, for example.

Figure 2:
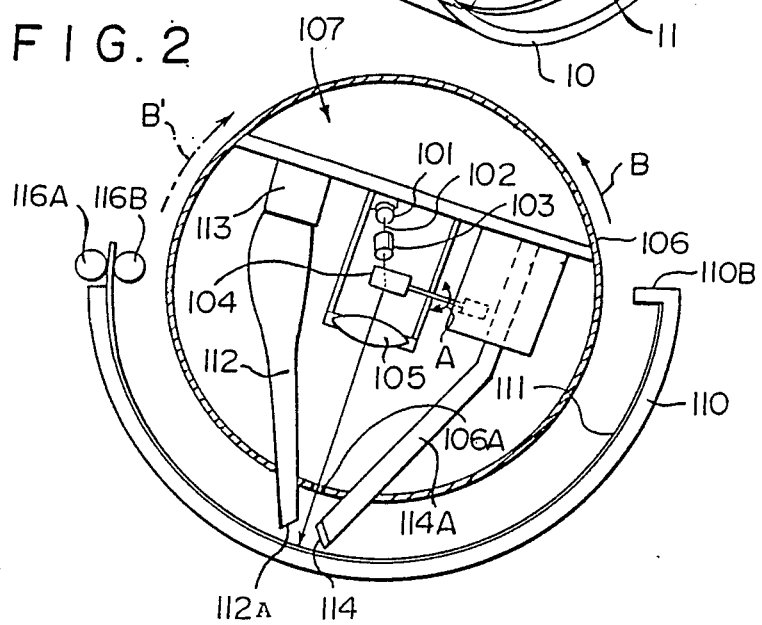
FIG. 2 is a transverse cross-sectional view of a radiation image information readout device employing the principles of the present invention.

FIG. 2 shows a readout device for reading out radiation image information in the above radiation image recording and readout system. The readout device is shown in its transverse cross section and viewed along the axis of angular movement of an optical unit (described below), the view illustrating a support on which a stimulable phosphor sheet is placed and various components in the optical unit.

A laser beam 102 emitted from a laser beam source 101 is converted by a beam expander 103 into a light beam having a suitable beam diameter. The expanded light beam 2 is then applied to a galvanometer mirror 104 which deflects the light beam 102 in the direction of the arrow A. After the deflected laser beam 102 has passed through a scanning lens 105 in the form of an f$\theta$ lens, the laser beam 102 goes through a slit 106A defined in a cylindrical member 106 and scans the surface of a stimulable phosphor sheet 111 supported on a semicylindrical support 110 in a direction normal to the sheet of FIG. 2. The laser beam source 101, the galvanometer mirror 104, and the f$\theta$ lens 105 are housed in the cylindrical member 106, thus providing an optical unit 107 capable of angular movement in the direction of the arrow B. Substantially the entire surface of the stimulable phosphor sheet 111 is two-dimensionally scanned by the laser beam 102 by causing the laser beam 102 to scan the stimulable phosphor sheet 111 (main scanning) and angularly moving the optical unit 107 (sub-scanning). The galvanometer mirror 104 is positioned on the axis of angular movement of the optical unit 107, and the laser beam 102 is deflected by the galvanometer mirror 104 in a direction substantially parallel to the axis of angular movement of the optical unit 107, which is coaxial with the center of curvature of the semicylindrical support 110. Other structural, positional, and functional details of the optical unit 107 and the support 110 are the same as those of the optical unit 7 and the support 10 shown in FIG. 1. The stimulable phosphor sheet 111 is delivered onto and off the support 110 by means of a pair of feed rollers 116A, 116B disposed at one end of the support 110, and is positioned on the support 110 by means of a stopper 110B on the opposite end of the support 110.

The stimulable phosphor sheet 111 is of a nature as disclosed in Japanese Kokais Nos. 55-12429 and 55-116340, for example. The stimulable phosphor sheet 111 stores thereon radiation image information of an object which has been recorded upon exposure to stimulating radiation such as an X ray that has passed through the object. When the laser beam 102 is applied to a portion of the stimulable phosphor sheet 111, that portion emits light in an intensity commensurate with the stored radiation image information. The emitted light enters a transparent light guide 112 through its entrance end 112A extending in the main scanning direction and having a length larger than the interval scanned in the main scanning direction. The emitted light is then guided by the light guide 112 into a photomultiplier 113. A filter (not shown) which selectively passes the emitted light only, but shuts off the stimulating radiation, is interposed between the joined surfaces of the light guide 112 and the photomultiplier 113. The photomultiplier 113 photoelectrically detects the emitted light that has passed through the filter and generates an electric signal representative of the radiation image information recorded on the stimulable phosphor sheet 111. The electric signal is then processed by an image information readout circuit, which applies an electric image signal to an image reproducer such as a CRT or a scanning recorder, so that an image carried by the electric image signal can be displayed on the CRT or reproduced as a hard copy by the scanning recorder.

A light collecting mirror 114 is supported on a support base 114A and positioned in confronting relation to the entrance end 112A of the light guide 112 across the portion of the sheet 111 which is scanned by the laser beam 102. The light collecting mirror 114 serves to reflect light emitted from the scanned portion of the sheet 111 toward the entrance end 112A of the light guide 112 so that the emitted light can efficiently be supplied to the light guide 112. The light guide 112, the photomultiplier 113, the light collecting mirror 114, and the support base 114A are fixedly positioned in the cylindrical member 106 for angular movement therewith, and serve as components of the optical unit 107. Alternatively, the light collecting mirror 114 may be dispensed with. As another alternative, the light collecting mirror 114 and the support base 114A may be replaced with another light guide and another photomultiplier, so that the light emitted from the sheet 111 can be directed to the two photomultipliers and electric signals from the photomultipliers can simultaneously be applied to the image information readout circuit.

In the radiation image information readout device, the main (final) reading mode in which the stimulable phosphor sheet is two-dimensionally scanned in the above manner may be preceded by a preliminary readout mode in which the stimulable phosphor sheet is scanned by stimulating low-energy radiation. In the preliminary read-out mode, light is emitted from the stimulable phosphor sheet upon exposure to stimulating low-energy radiation so as to obtain information based on which the final readout gain is adjusted in order to eliminate unwanted effects of varying conditions in which the image was recorded on the stimulable phosphor sheet and also to generate a radiation image that can be better observed. During the preliminary read-out mode, it is possible to angularly move the optical unit in the direction of the arrow B' (FIG. 2) which is opposite to the sub-scanning direction in the main reading mode.

With the stimulable phosphor sheet 111 fixed on the semicylindrical support 110, the optical unit 107 is angularly moved to scan the stimulable phosphor sheet 111 in the sub-scanning mode while the stimulable phosphor sheet 111 is being scanned in the main scanning mode by the laser beam 102, in the same manner as described with reference to FIG. 1.

The optical components such as the light beam source and the light deflector need not necessarily be disposed in the cylindrical member, but may be positioned in other locations provided they are angularly movable for scanning the sheet in the sub-scanning mode.

The principles of the present invention are also applicable to light beam scanners for use in image scanning recording devices. The various optical elements employed in the light beam scanner are not limited to the types and configurations described above.

Although a certain preferred embodiment has been shown and described, it should be understood that many changes and modifications may be made therein without departing from the scope of the appended claims.

I claim:

1. A two-dimensional light beam scanner comprising:
   (i) support means having a cylindrical surface for supporting a sheet to be scanned;
   (ii) a light source for emitting a light beam;
   (iii) a main scanning light deflector disposed at the axis of curvature of said cylindrical surface for deflecting said light beam from said light source toward said cylindrical surface so as to scan the sheet supported by said cylindrical surface with said light beam in a main scanning direction substantially parallel to said axis; and
   (iv) sub-scanning means for angularly moving said light source and said main scanning light deflector about said axis so as to scan the sheet supported by said cylindrical surface with said light beam in a sub-scanning direction normal to said main scanning direction, wherein said subs-scanning means comprises a hollow cylindrical member in which said light source and said main scanning light deflector are fixedly supported, and a motor coupled to one axial end of said hollow cylindrical member for angularly moving said hollow cylindrical member about said axis of curvature of said cylindrical surface.

2. A light beam scanner according to claim 1, wherein said support means comprises a substantially semicylindrical support having said cylindrical surface on the concave side thereof.

3. A light beam scanner according to claim 2, further including feed means disposed along one edge of said semicylindrical support for delivering said sheet onto and removing said sheet from said cylindrical surface, and a stop disposed along the opposite edge of said semicylindrical support for stopping said sheet in a predetermined on said cylindrical surface when said sheet is delivered onto said cylindrical surface by said feed means.

4. A light beam scanner according to claim 1, wherein said hollow cylindrical member has an axial slit in the cylindrical wall thereof for allowing said light beam deflected by said main scanning light deflector to pass out of said hollow cylindrical member toward said cylindrical surface.

5. A radiation image information readout device for reading out radiation image information stored on a recording sheet, comprising:
   (i) support means having a cylindrical surface for supporting the recording sheet;
   (ii) a light source for emitting a light beam;
   (iii) a main scanning light deflector disposed at the axis of curvature of said cylindrical surface for deflecting said light beam form said light source toward said cylindrical surface so as to scan the recording sheet supported by said cylindrical surface with said light beam in a main scanning direction substantially parallel to said axis;
   (iv) sub-scanning means for angularly moving said light source and said main scanning light deflector about said axis so as to scan the recording sheet supported by said cylindrical surface with said light beam in a sub-scanning direction normal to said main scanning direction; and
   (v) readout means angularly movable with said light source and said main scanning light deflector for reading out said radiation image information stored on the recording sheet while the recording sheet is scanned by said light beam in said main and sub-scanning directions, wherein said sub-scanning means comprises a hollow cylindrical member in which said light source, said main scanning light deflector, and said readout means are fixedly supported, and a motor coupled to one axial end of said hollow cylindrical member for angularly moving said hollow cylindrical member about said axis of curvature of said cylindrical surface.

6. A radiation image information readout device according to claim 5, wherein said support means comprises a substantially semicylindrical support having said cylindrical surface on the concave side thereof.

7. A radiation image information readout device according to claim 6, further including feed means disposed along one edge of said semicylindrical support for delivering said recording sheet onto and removing said recording sheet from said cylindrical surface, and a stop disposed along the opposite edge of said semicylindrical support for stopping said recording sheet in a predetermined position on said cylindrical surface when said recording sheet is delivered onto said cylindrical surface by said feed means.

8. A radiation image information readout device according to claim 5, wherein said hollow cylindrical member has an axial slit in the cylindrical wall thereof for allowing said light beam deflected by said main scanning light deflector to pass out of said cylindrical member toward said cylindrical surface.

* * * * *